United States Patent [19]

Champagne

[11] Patent Number: 4,998,652
[45] Date of Patent: Mar. 12, 1991

[54] BICYCLE CLAMP-ON WATER BOTTLE BOSSES

[76] Inventor: Kirby J. Champagne, 412 Parkside Dr., Lafayette, La. 70501

[21] Appl. No.: 420,758
[22] Filed: Oct. 12, 1989
[51] Int. Cl.$^5$ .................................. B62J 11/00
[52] U.S. Cl. .................................. 224/39; 224/30 R; 248/230
[58] Field of Search ............... 224/30 R, 32 R, 35, 224/37–39, 31, 41; 248/230, 231.6

[56] References Cited

U.S. PATENT DOCUMENTS

| 176,353 | 4/1876 | Riddle | 248/230 |
|---|---|---|---|
| 596,998 | 1/1898 | Hawkins et al. | 224/39 X |
| 1,132,554 | 3/1915 | Brett | 248/230 |
| 1,179,661 | 4/1916 | Selah | 248/230 |
| 1,281,840 | 10/1918 | Roffy | 224/39 R |
| 3,603,549 | 9/1971 | Brilando et al. | 248/230 |
| 4,095,812 | 6/1978 | Rowe | 224/35 X |
| 4,193,525 | 3/1980 | Sommers | 224/35 |
| 4,301,951 | 11/1981 | Pletscher | 224/32 R |
| 4,328,915 | 5/1982 | Melton, III | 224/32 R |
| 4,334,642 | 6/1982 | Reisch | 224/37 |
| 4,345,704 | 8/1982 | Boughton | 224/39 |
| 4,386,721 | 6/1983 | Shimano | 224/39 |
| 4,437,596 | 3/1984 | Shook | 224/39 |
| 4,711,722 | 12/1987 | Ibanez | 248/230 |
| 4,754,902 | 7/1988 | Opfergelt | 224/41 |
| 4,830,240 | 5/1989 | Tackles et al. | 224/35 |
| 4,852,291 | 8/1989 | Mengo | 248/231.6 X |
| 4,883,205 | 11/1989 | Saelens et al. | 224/32 R |

Primary Examiner—Henry J. Recla
Assistant Examiner—Casey Jacyna

[57] ABSTRACT

A clamp-on water bottle holder for bicycles will be made of various metals and plastics to retro-fit those bicycles which don't have factory installed braze-on bosses. They will come in many model types and will also fit current bicycles which do have factory installed braze-ons. All clamp-on models will fit either type of bicycle.

The variety of clamping devices will be determined by the composition of the particular clamp-on model and economics. The clamp-on bosses will be modular and adjustable to different bicycle frame tubing sizes. Some models of clamp-on bosses will hold more than one water bottle holder per set of bosses. Accessories will directly attach to factory installed braze-on bosses allowing for more than one holder.

1 Claim, 12 Drawing Sheets

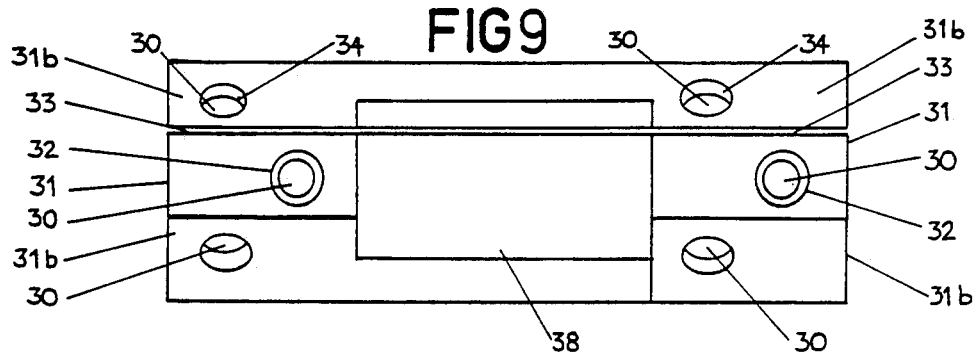
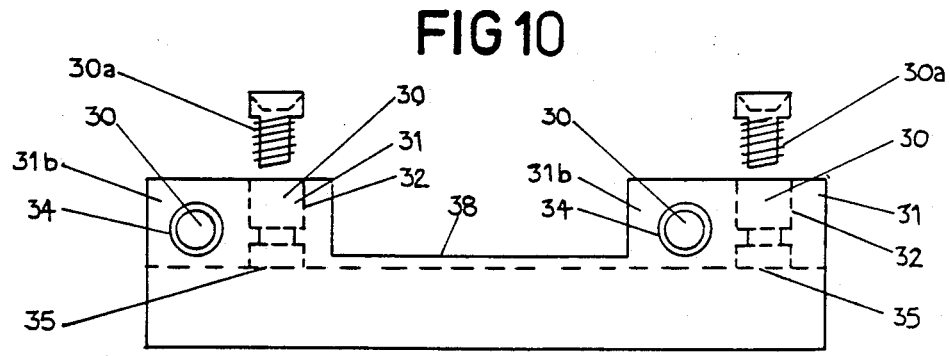
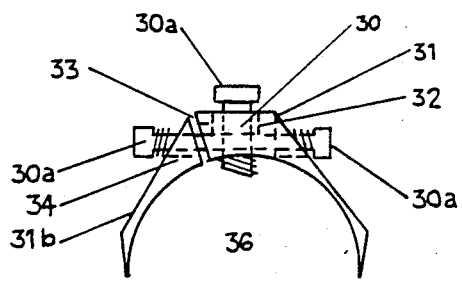
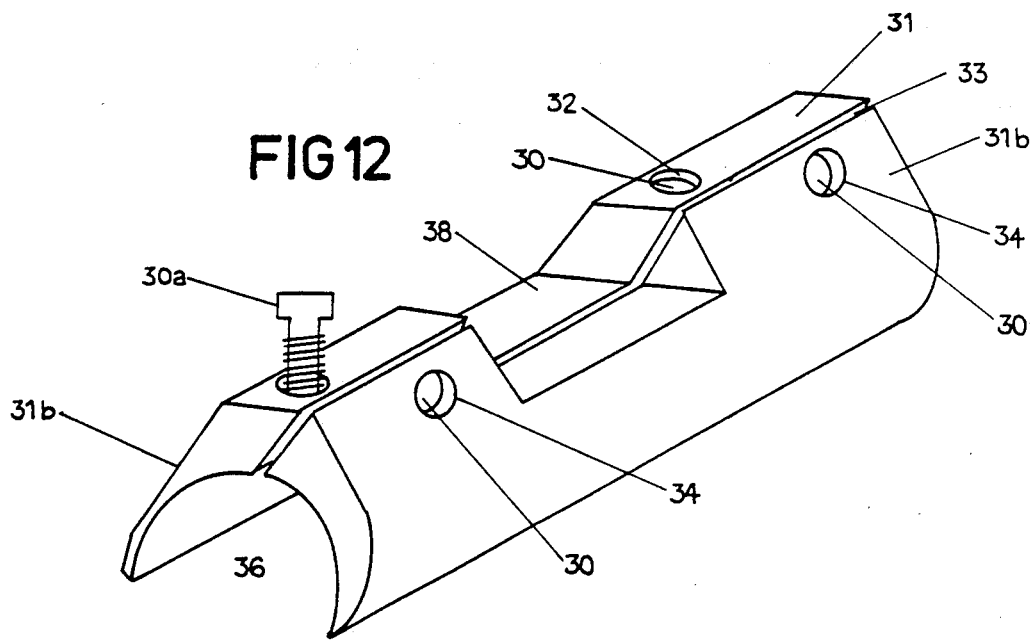

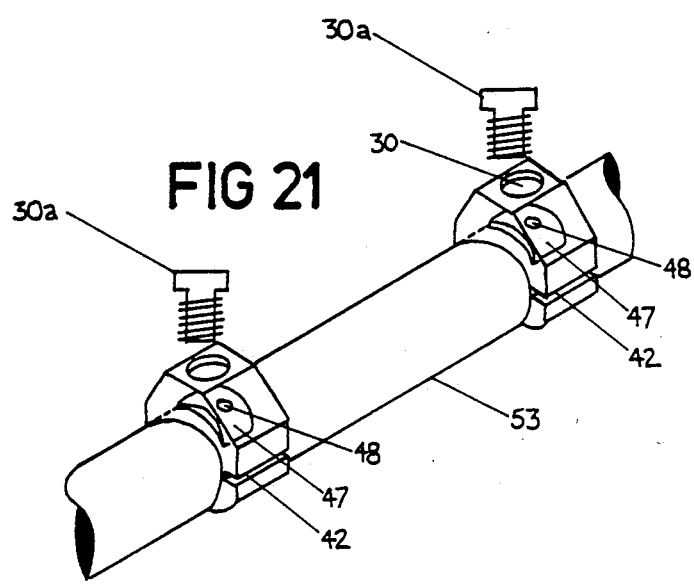
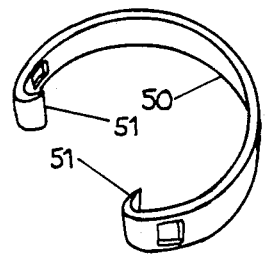
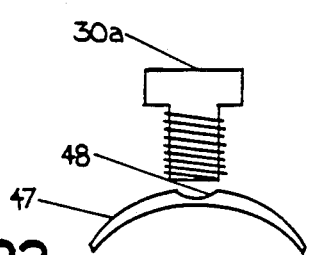
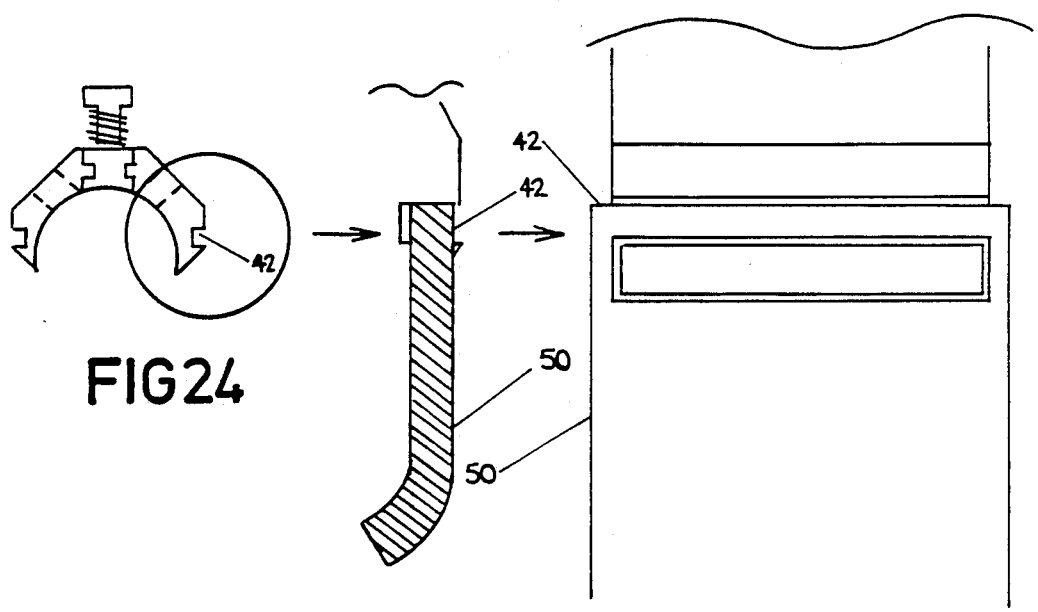

BICYCLE CLAMP-ON WATER BOTTLE BOSSES

FIELD OF THE INVENTION

My invention relates to bicycles in general and a water bottle holder accessory in particular.

PRIOR ART DESCRIPTION

Modern bicycle riding has incorporated an original equipment manufactured accessory called a brazed on water bottle holder boss. This accessory has become an industry standard for firmly securing a water bottle holder to the tubing of a conventional bicycle.

This boss fixture is located on the tubing of a bicycle frame usually midway on the down tube and seat tube. The boss is a metal fixture permanently afixed to the tubing by brazing or bonding. One boss fixture houses a threaded five millimeter slot which accepts a five millimeter bolt. A pair of these boss fixtures is spaced laterally from one another on the bicycle tubing so as to align with the two slots of a conventional water bottle holder. Some less expensive, mass produced bicycle tubing is drilled and threaded directly to the tubing without brazing.

When the consumer buys the bicycle with these brazed on bosses they become the method which holds water bottle holders. Water bottle holders are made of metals and plastics which are slotted to align with the brazed on boss fixtures of a bicycle.

The water bottle holders are attached with five millimeter hex bolts which in turn bolt into the bicycle boss fixtures. A recent trend in the industry has been to use a pair of brazed on water bottle boss fixtures to hold tire inflation accessories such as a frame air pump which is used to inflate tires.

From the now firmly attached water bottle holder, a water bottle containing fluids can be conveniently handled while riding to replenish lost fluids and quench a rider's thirst.

The addition of brazed on water bottle bosses has enhanced the sport of bicycling. Factory installed water bottle brazed on boss fixtures are now found on most currently made quality bicycles.

All Terrain Bicycles, sometimes called ATBs, usually have two pairs of factory installed brazed on water bottle boss fixtures. One pair of brazed bosses is on the down tube and another pair of bosses brazed to the seat tube. Industry evolution and consumer demand have increased the need for more sets of these brazed on water bottle holder bosses. The trend is for more brazed on bosses located along the down and seat tubes. Some companies are now locating these boss fixtures onto the stems of certain bicycles.

Factory installed brazed on water bottle holder boss fixtures are useful but present certain problems with respect to frame integrity. A hole must be drilled through the already thin tubing of the bicycle. Heat is then applied using a torch to permanently braze the boss fixtures to the frame. This heat causes metallurgical changes which weakens the tubing.

Factory installed brazed on boss fixtures traditionally allow for only one water bottle holder per pair of bosses. No device is known which will allow two or more water bottle holders to be attached to a pair of factory installed brazed on water bottle boss fixtures.

Bicycle owners who have bicycles which were constructed without factory installed boss fixtures must resort to the use of various after market clamping devices. These clamping devices are usually of some banded strap assembly made of metal or plastic. None of these assemblies offer the cyclist much versatility. They are usually of low quality and cheaply made. These clamps range from radiator hose varieties to plastic semi circles around the tubing held by a wingnut. Most plastic models do not allow for difference in tubing sizes other than the use of shim material which is usually not included. These clamp assemblies hold one water bottle holder.

None is known which can hold more than one water bottle holder nor is one known which can bolt directly to pre-existing brazed on boss fixtures and house two or more water bottle holders.

SUMMARY OF THE INVENTION

This invention and its variations provide for an improved method of attaching one or more water bottle holders to bicycles which have no factory installed water bottle holder boss fixtures. Bicycles which have factory installed boss fixtures can utilize this invention for adding two or more water bottle holders per pair of pre-existing brazed on boss fixtures.

My clamp on boss and its variations have five millimeter hex threaded slots located at specified distances which accept traditional water bottle holders via the industry standard five millimeter hex bolt.

The total length of specific clamp on boss models and total number of five millimeter threaded slots are determined by consumer choice and needs.

When bicycle tubing has factory installed brazed on water bottle boss fixtures, specific clamp on models can be used. Bicycles without factory installed brazed on water bottle holder boss fixtures may require my other design variations to satisfy cyclists' needs. Frame size will be a factor in selecting a specific clamp on boss model over another clamp on model variation.

The invention and its design variations may be made of metals or plastic composites. The prototypes are machined from 6011T aluminum alloy but can be cast or injected.

Some clamp on design variations will utilize various conventional and unconventional clamping devices such as bands and straps. Other clamp on boss variations will be self clamping to bicycle tubing using the appropriate arc radius past the diameter.

This particular self clamping model will be sliced lengthwise forming two separate body sections. The two body sections will be attached to each other by counter sunk five millimeter hex bolts. All design variations, however, can be profiled and angled in this manner and thereby made self clamping.

Smaller framed bicycles are not restricted from being able to utilize more water bottle holders. The clamp on boss and its design variations allow twin water bottle holders to be placed on the front and backside of the down tube near the steering tube.

On the down tube one pair of factory installed boss fixtures will hold one water bottle. With one or more clamp on boss models four extra water bottle holders can now be used conveniently and without pedaling or tire interference.

The above mentioned water bottle holder arrangement can also be incorporated for the seat tube. The factory installed brazed on bosses located on the seat tube will hold one water bottle holder. The back of the seat tube near the top portion can have two or more water bottle holders attached to one of my clamp on bosses. The cyclist can easily reach behind and retrieve a bottle of liquid.

Placement of the clamp on water bottle holder boss models in the above positions will not intefere with the tires or pedaling.

Presently a bicycle with two sets of factory installed brazed on water bottle holder boss fixtures can hold only two water bottle holders. With my invention four or more water bottle holders can be added without interference to the pedaling motion.

Those bicycles not having factory installed brazed on bosses can achieve the same number of water bottle holders by utilizing two or more models of my clamp on boss and its variations.

OBJECTS AND ADVANTAGES

Accordingly I claim the following as objects and advantages of the invention: to provide a quality device for holding one or more bicycle water bottle holders easily, reliably, and with minimal mechanical skill.

In addition I claim the following additional objects and advantages: to provide a versatile, modular arrangement of different design variation embodiments for bicyclists who have no factory installed brazed on water bottle bosses, or do not have enough brazed on bosses, or who frequently change water bottle position.

In addition I claim the following additional objects and advantages: to provide a device which will have accurately spaced slots to align with water bottle holder slots, compensate for different tubing sizes such as forks, stays, and seat posts, retrofit all conventional bicycles, easy manuverability, non rusting, and non marring of the painted surfaces.

Readers will find further objects and advantages of the invention from a consideration of the ensuing description and the accompanying drawings.

BRIEF DESCRIPTION OF THE DRAWINGS

The above and other elements of the present invention are described with respect to the drawings in which:

FIGS. 9-11 are a top, side, front view respectively of an alternative embodiment pictorial, FIG. 12.

FIGS. 21-23 are pictorial representations of a clamping method.

FIG. 24 is a pictorial representation of another clamping method.

Figure 1:
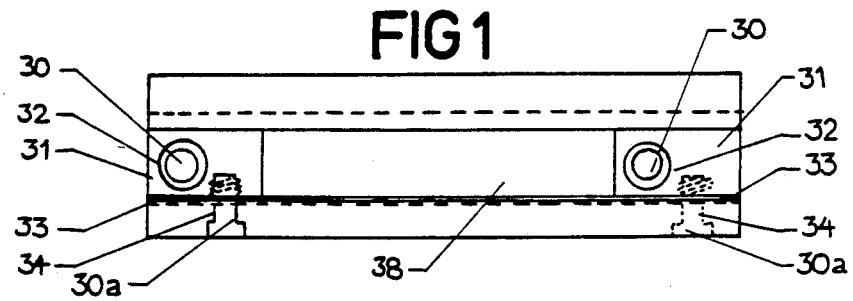
FIGS. 1-3 are a top, front, side view respectively of accompanying pictorial, FIG. 4.

DRAWING REFERENCE NUMERALS 30 five millimeter threaded slots
30a five millimeter threaded bolts
31 top boss base of all design embodiments
31b side boss base of all design embodiments
32 top boss base counter sunk hole
33 twenty two degree slice
34 side boss base counter sunk hole
35 counter sunk hole for existing boss
36 arc radius
38 body
42 slotted channel
43 lip for clamp attachment surface
44 neck
47 presser foot
48 oval depression on top of presser foot
50 band or strap
51 hook end
53 generic tubing
54 machine bolt which screws into button
55 bicycle down tube
56 bicycle seat tube
57 water bottle holder
58 traditional bolts used to secure water bottle holder
59 factory installed brazed on water bottle holder boss fixtures.
60 water bottle holder slots

DETAILED DESCRIPTION OF THE INVENTION

Figure 2:
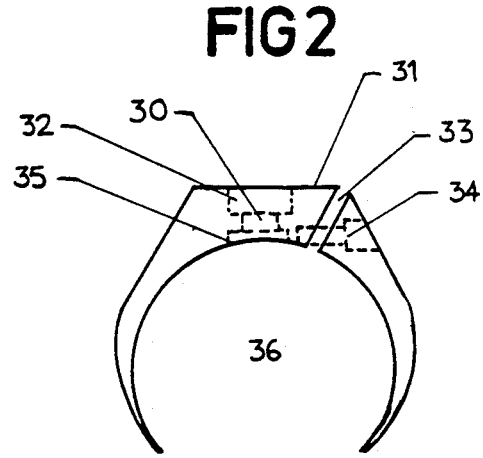
Figure 3:
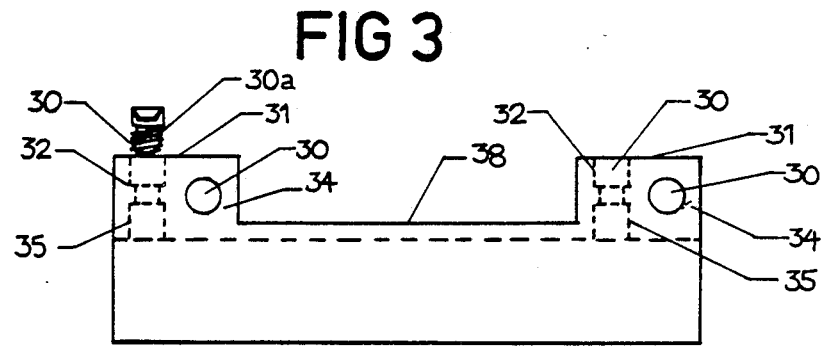
Figure 4:
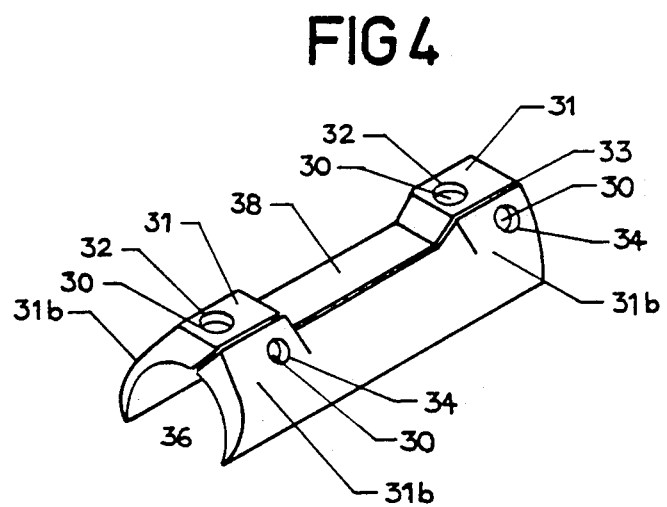
FIG. 4 is a presently preferred embodiment of my clamp on water bottle holder boss.
Figure 26:
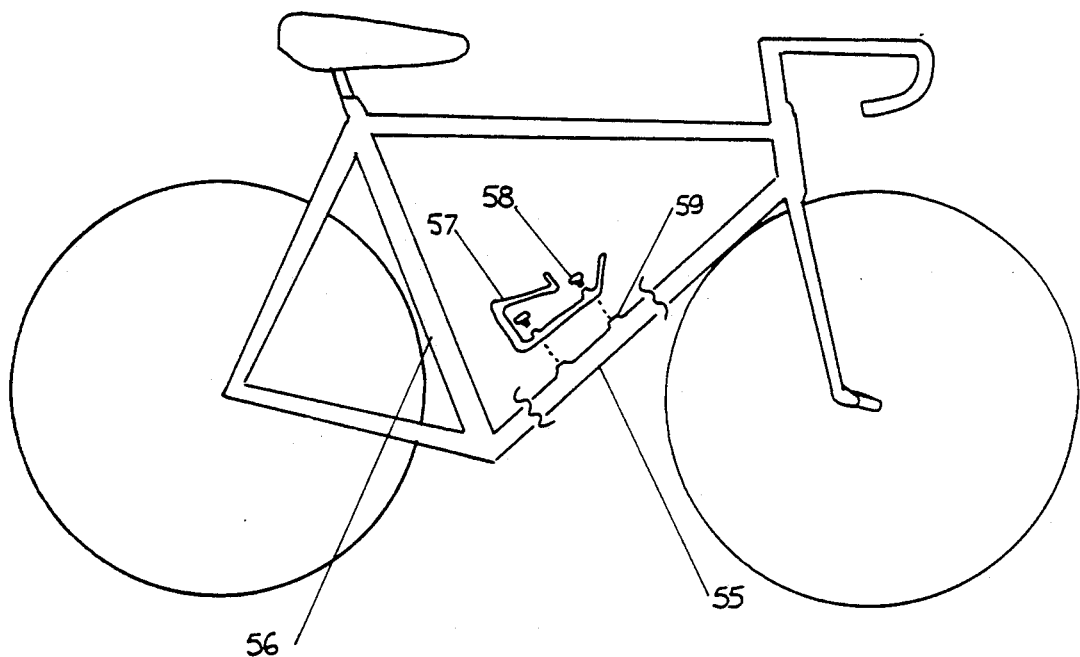
FIG. 26 is a traditional method of attaching one water bottle holder to the down tube of a conventional bicycle with a pair of factory installed brazed on bosses.

FIGS. 1-4 and FIG. 17 illustrate the use of a presently preferred embodiment of my water bottle holder clamp on boss. FIG. 4 is a basic model embodiment which is self-clamping to various sized bicycle tubing. Typically the clamp on boss FIG. 4 is attached to a bicycle down tube 55 and seat tube 56 in FIG. 26.

Figure 27:
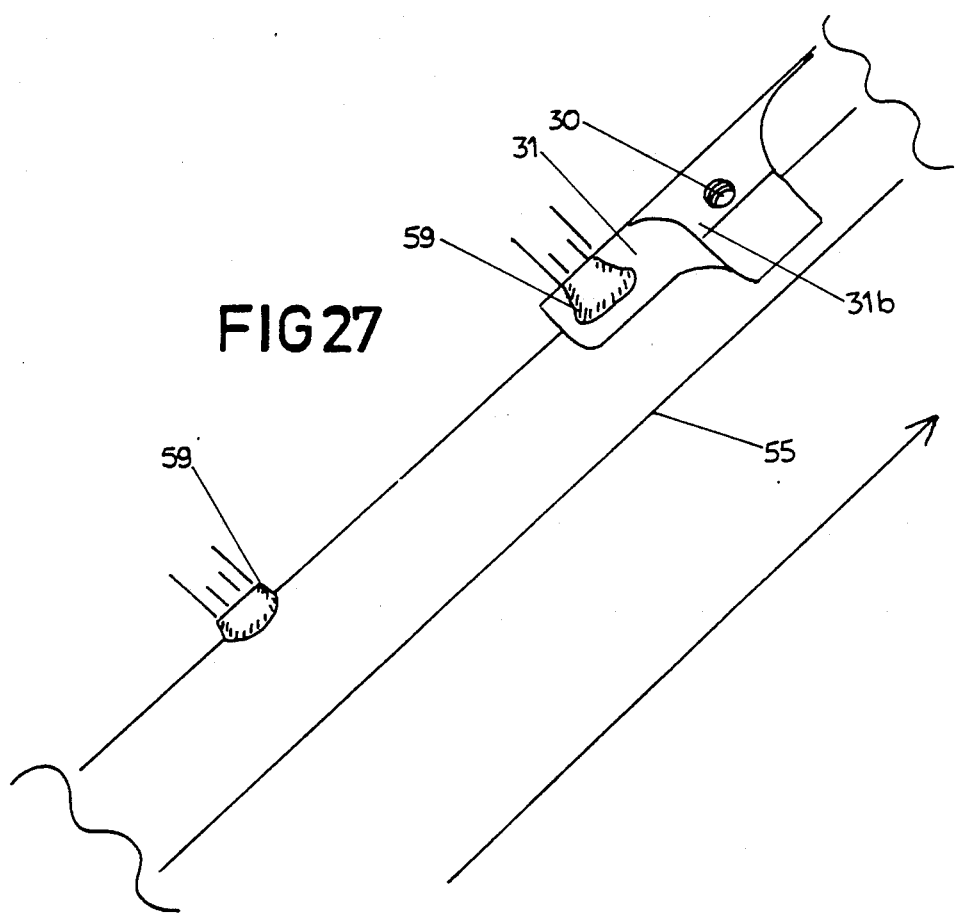
FIG. 27 is one clamping embodiment used on smaller bicycle frames by utilizing factory installed brazed on bosses in conjunction with one of my clamp on boss embodiments to provide pedal clearance when two water bottle holders are attached.

As shown in FIG. 4, this clamp on comprises two separate body sections which are joined by two five millimeter hex bolts 30a in FIG. 1. The five millimeter bolts are received into counter sunk cavities 34 which give a smooth appearance. FIG. 3 shows a side view where the five millimeter slot 30 is tapped and threaded to receive five millimeter hex bolts. Continuing with FIG. 3, the top boss base 31 with a five millimeter threaded slot 30 is counter sunk both top 32 and bottom 35. Counter sunk holes are not essential when attaching the clamp on to bicycles without factory installed brazed on bosses. However most factory installed bosses extend beyond the tubing outside diameter surfaces. FIG. 27 shows a detail of factory installed bosses with a clamp on variation attached to the top boss 59. The countersinking 35 in FIG. 3 compensates for the factory installed boss extension and allows for a flush fit to the tubing.

In FIG. 1, the countersunk hole 32 is for aesthetic purposes and manufacturing uniformity on this particular clamp on boss model. Other clamp on boss designs may require this countersinking for using various bands and strap mechanisms such as illustrated in FIGS. 21-24.

Figure 28:
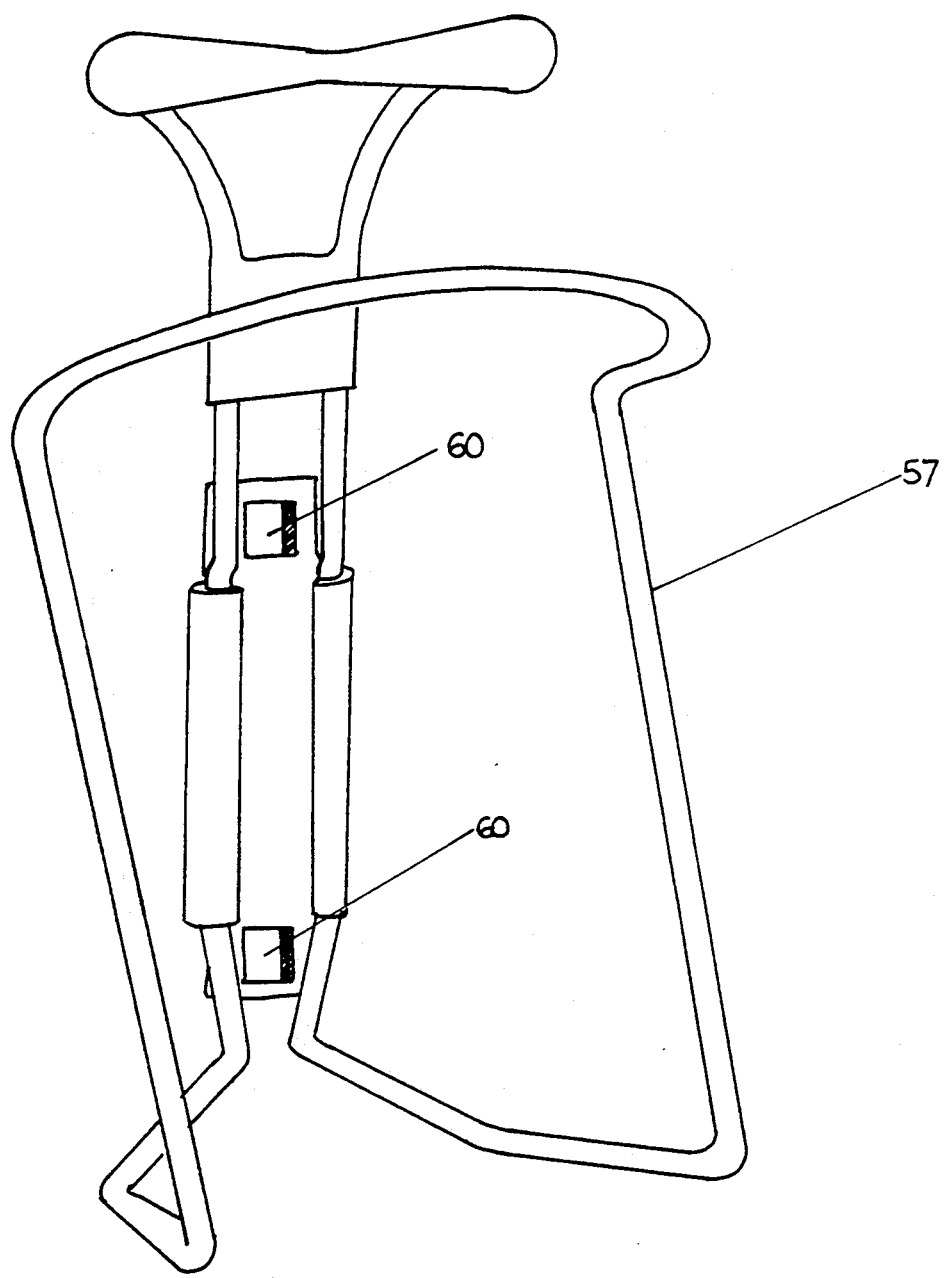
FIG. 28 is a representation of a typical water bottle holder with slots to receive five millimeter hex bolts.

FIG. 4 shows four five millimeter slots. The slots 30 on the top boss base 31 are spaced accurately to accept water bottle holder slots 60 in FIG. 28. Side boss base slots 30 are also spaced to align with water bottle holder slots. Side boss base slots 30 are offset from top boss base slots 30 to prevent threads from running into each other.

FIG. 4, as configured, is a basic clamp on boss which holds one water bottle holder 57. The threaded five millimeter slots 30 on the side boss base 31b are the means of drawing the two body halves tightly around the bicycle tubing of this paticular model clamp on. On alternative embodiment clamp on boss models such as in FIG. 12, the side boss base 31b and its threaded five millimeter slots 30 are spaced to receive a water bottle holder 57 as well as be the means of drawing the two body halves together.

FIG. 2 illustrates a frontal view where an arc radius 36 is shown. Reduction to practice for this embodiment has demonstrated that the arc radius 36 should extend below the diameter of the tubing for a firm and tight grip. The slice 33 which separates the two body halves is angled at twenty two degrees. Reduction to practice has proven this angle to be the most consistent for the clamp on boss and its alternative embodiments.

Figure 5:
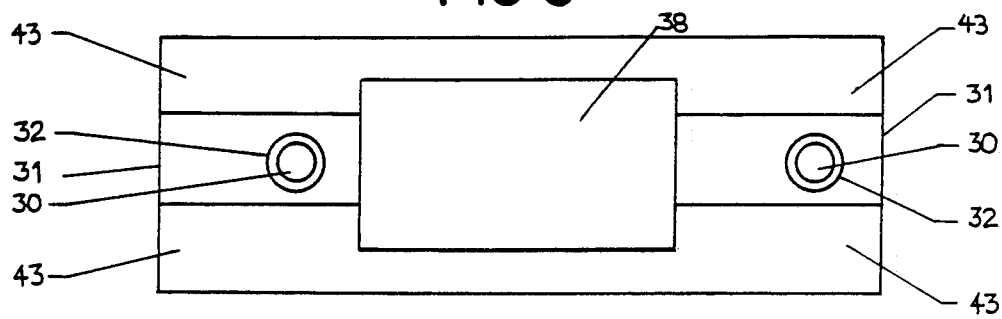
FIGS. 5-7 are a top, side, front view respectively of an alternative embodiment pictorial, FIG. 8.
Figure 6:
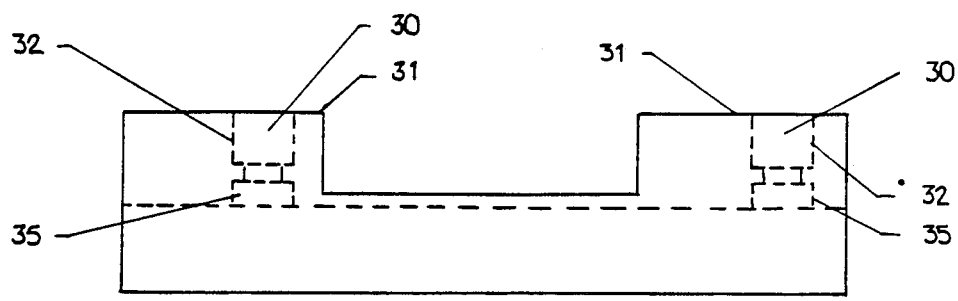
Figure 7:
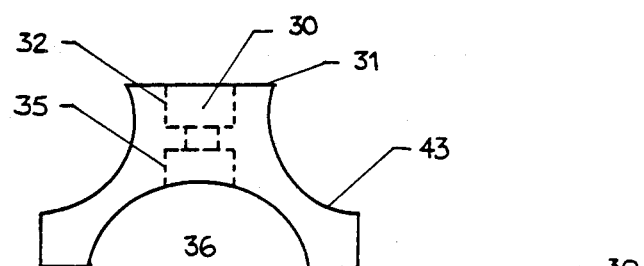
Figure 8:
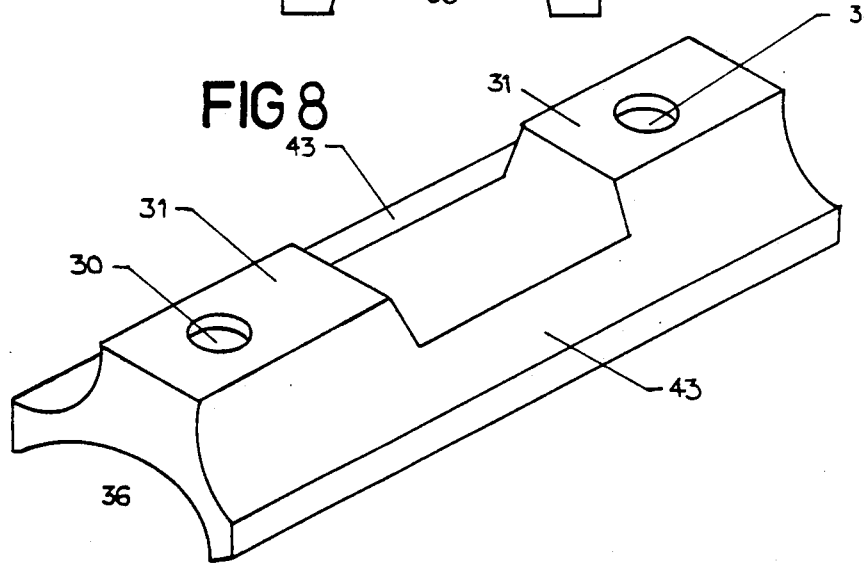
Figure 13:
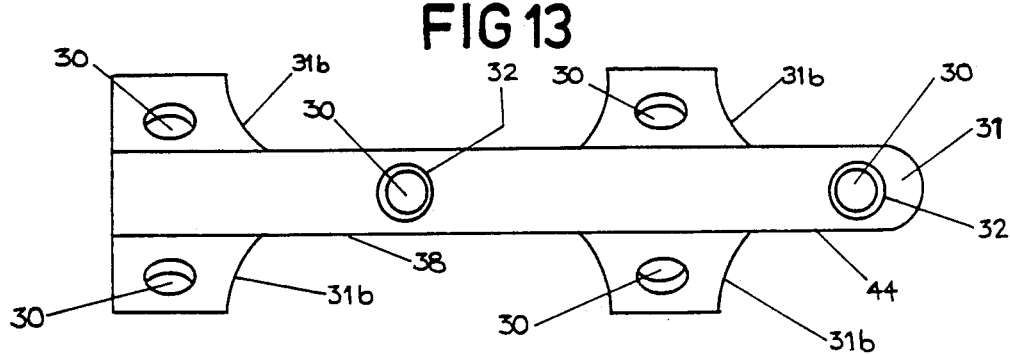
FIGS. 13-15 are a top, front, side view respectively of an alternative embodiment pictorial, FIG. 16.
Figure 14:
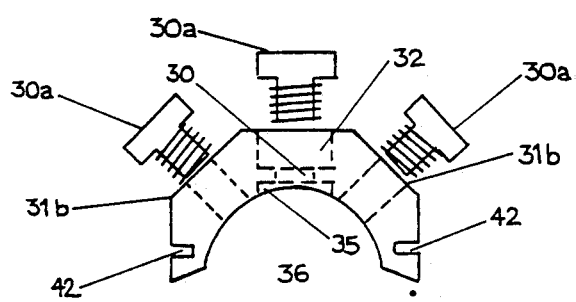
Figure 15:
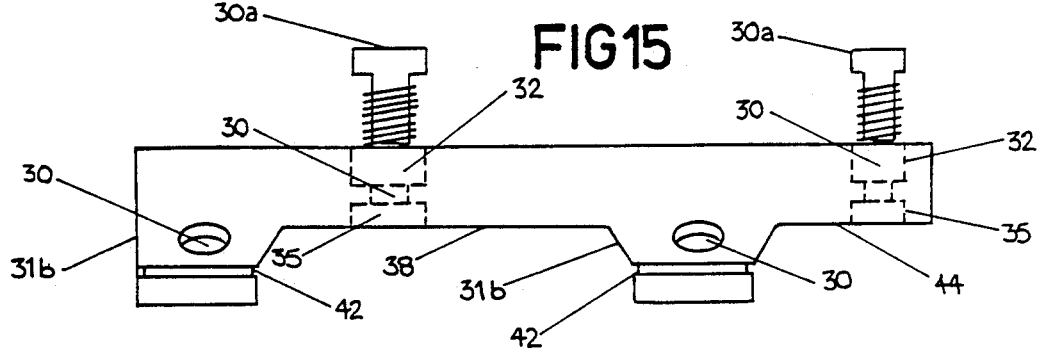

FIGS. 5–7 and the accompanying pictorial, FIG. 8, are an alternative embodiment of FIG. 4. FIG. 8 is a simplified version not incorporating a self clamping method. The arc radius 36 is above diameter to simply rest upon the tubing. Attachment to tubing is accomplished with simple hook bands FIG. 23, 50. Bands attach to a bottom lip 43 in FIG. 8. Alternative means of attachment such as brake lever clamps (not shown) can wrap around the body 38 in FIG. 8. An inexpensive gun scope mount (not shown) has been reduced to practice with this particular clamp on design.

FIG. 12 is the pictorial of FIGS. 9–11. Similar to clamp on boss model in FIG. 4, this variation holds two water bottle holders using both boss base sides 31b.

The top boss base and its threaded slots are now free for attaching the model directly to the bicycle frame's existing bosses. Accessories such as an air pump can also be used.

FIG. 9 shows both side boss bases 31b with four five millimeter threaded slots 30. There are two slots 30 per clamp on side boss base 31b. Each pair of slots 30 per side boss base 31b is spaced to receive water bottle holder slots, FIG. 28, 60. The boss base sides 31b are profiled and angled to allow for accessories on the top boss base 31.

Figure 18:
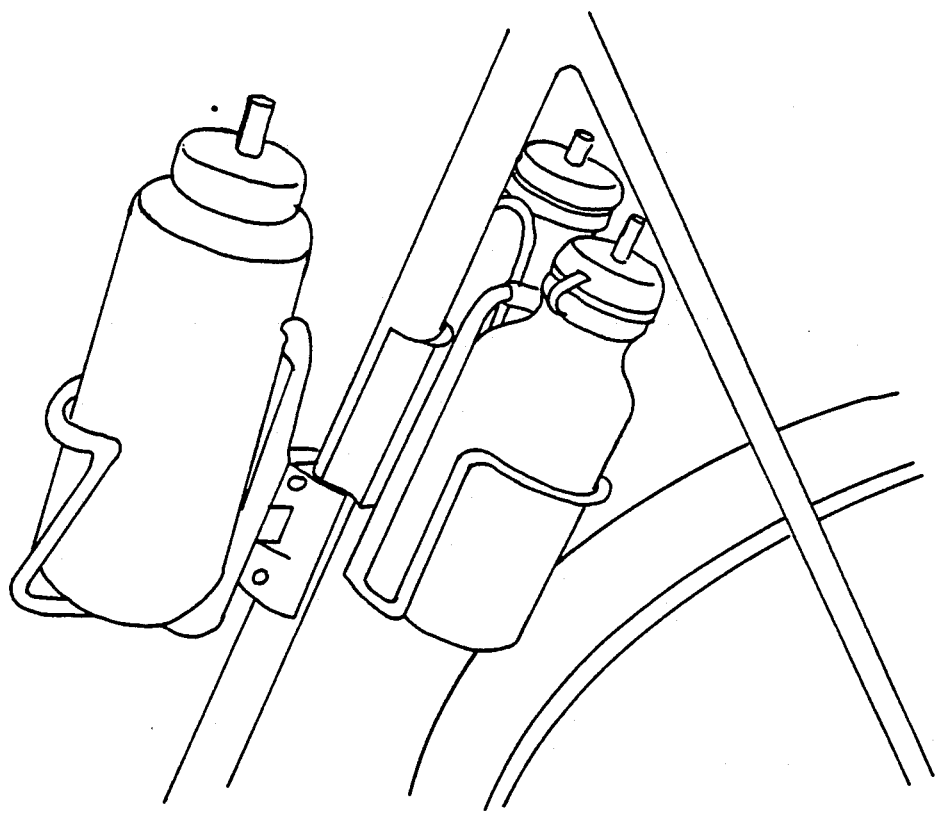
Figure 19:
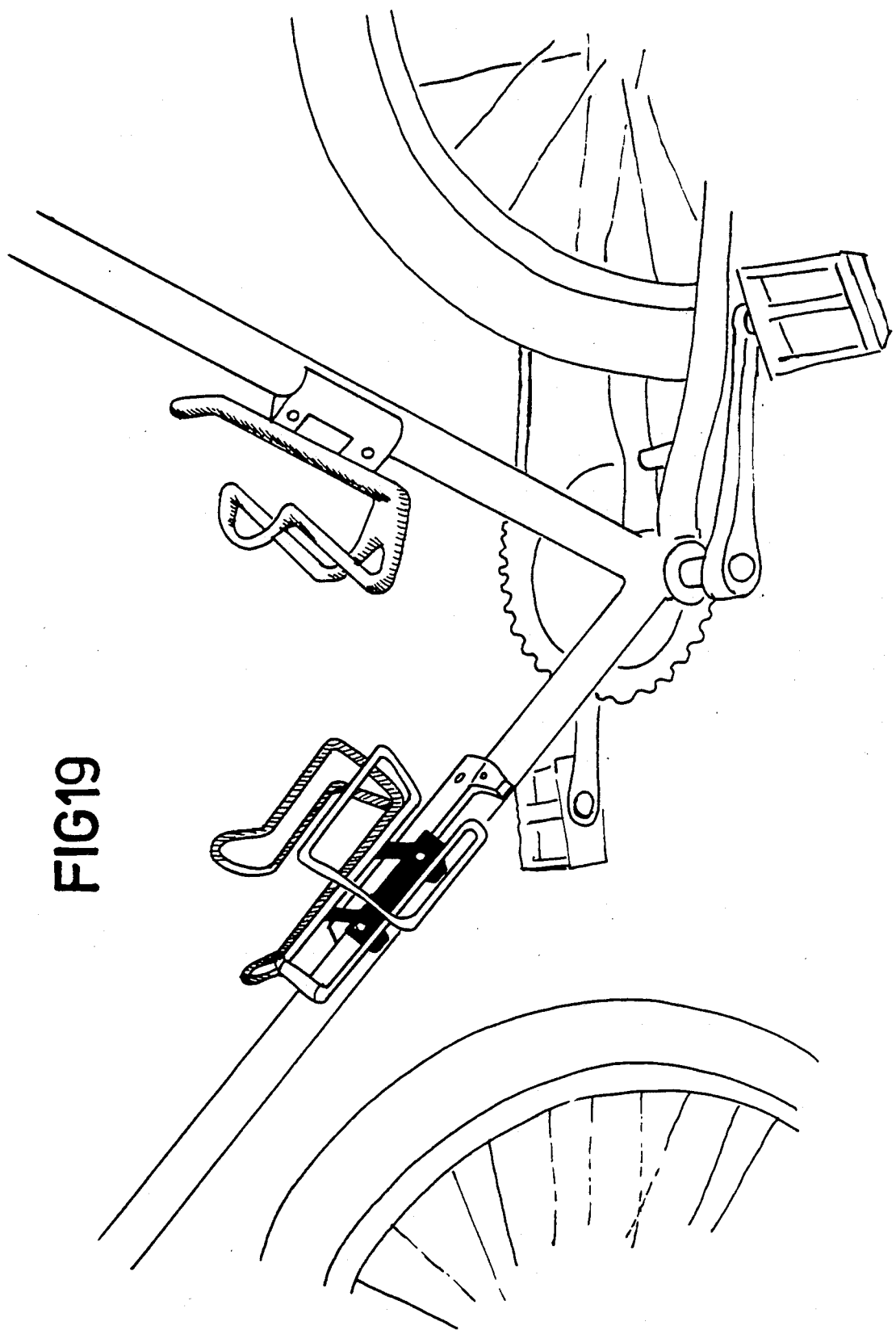
Figure 20:
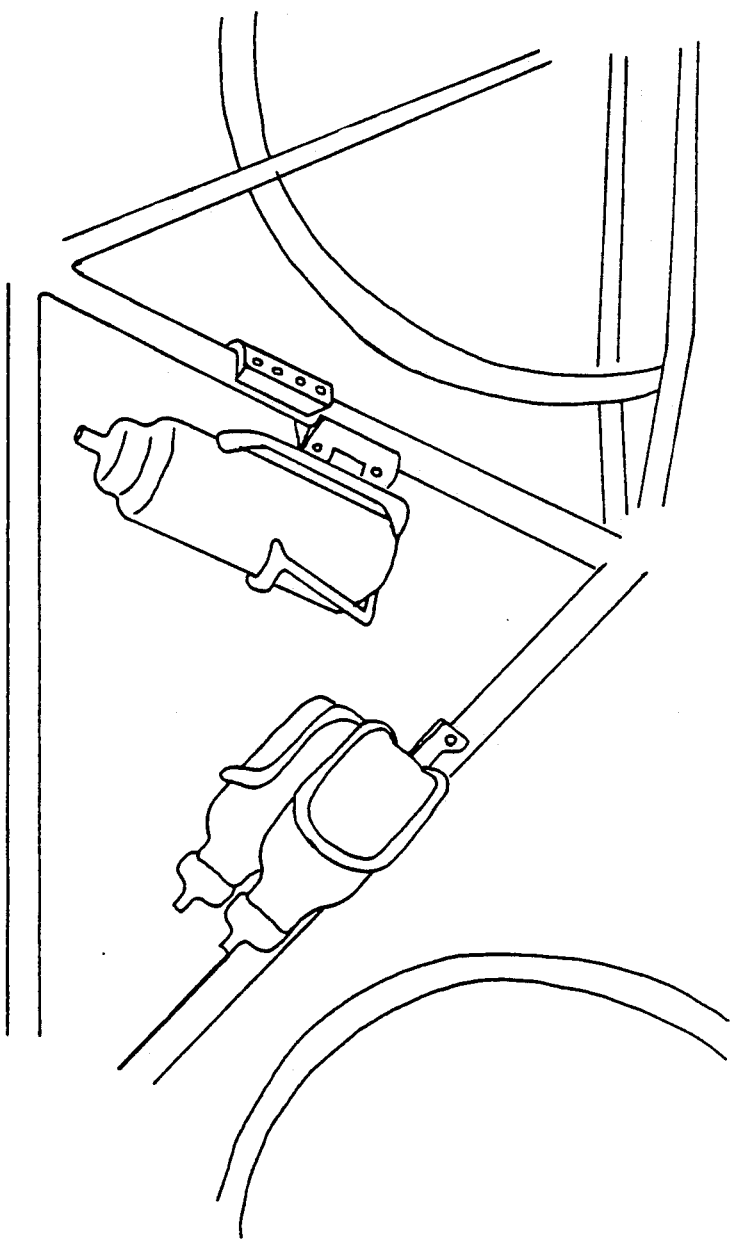
Figure 25A:
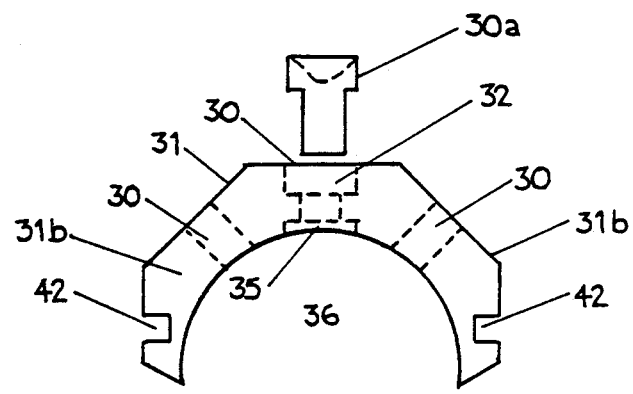
FIGS. 25a-d is front, side, top view with accompanying pictorial of an alternative embodiment of FIGS. 1-4. The pictorial shows two individual clamp on bosses.
Figure 25B:
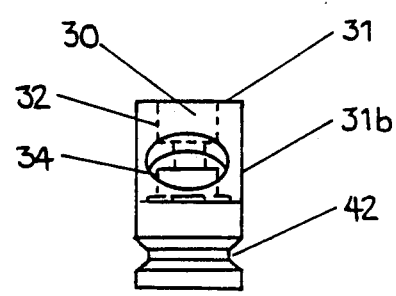
Figure 25C:
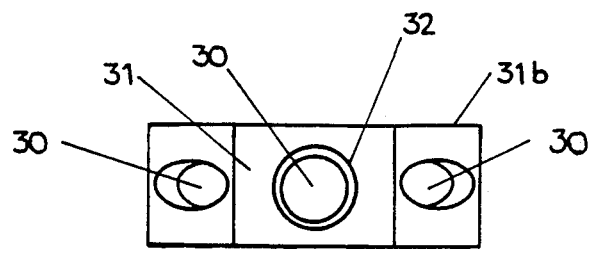
Figure 25D:
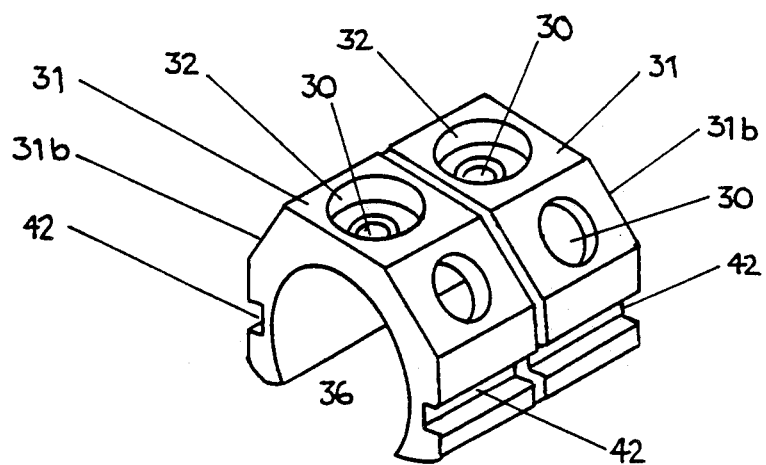

FIGS. 18–20 pictorially illustrate the embodiment of two water bottle holders attached to my clamp on bosses. This self clamping model variation FIG. 12 will fit bicycle tubing with or without factory installed brazed on water bottle holder boss fixtures.

The down tube of larger framed bicycles can utilize this particular model, as is, to convert existing brazed on bosses to a twin water bottle holder system.

Presently some down tubes of smaller framed bicycles can not achieve the above retro fit because pedaling motion will be disturbed. If factory installed boss fixtures are moved higher on the down tube the conversion to twin bottle holders per one pair of brazed bosses can be accomplished.

FIGS. 13–16 is an alternative embodiment clamp-on boss which solves the above problem of disturbed pedaling motion for smaller framed bicycles. This model has been lengthened and trimmed along the body sides 38. A neck 44 has been added to lengthen the clamp on boss higher on the down tube so as to clear pedal motion. Total length and total number of slots 30 are determined by cyclist's needs due to variables such as frame size and kinds of riding done by the cyclist.

Figure 16:
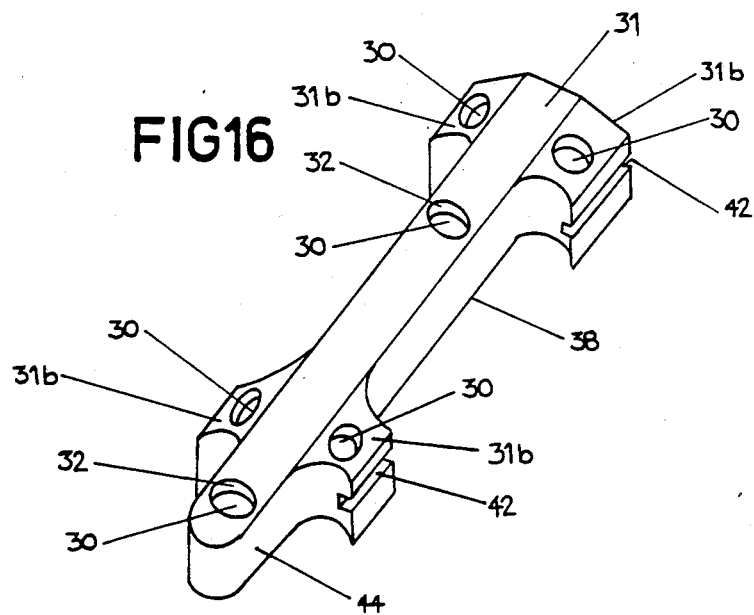
Figure 17:
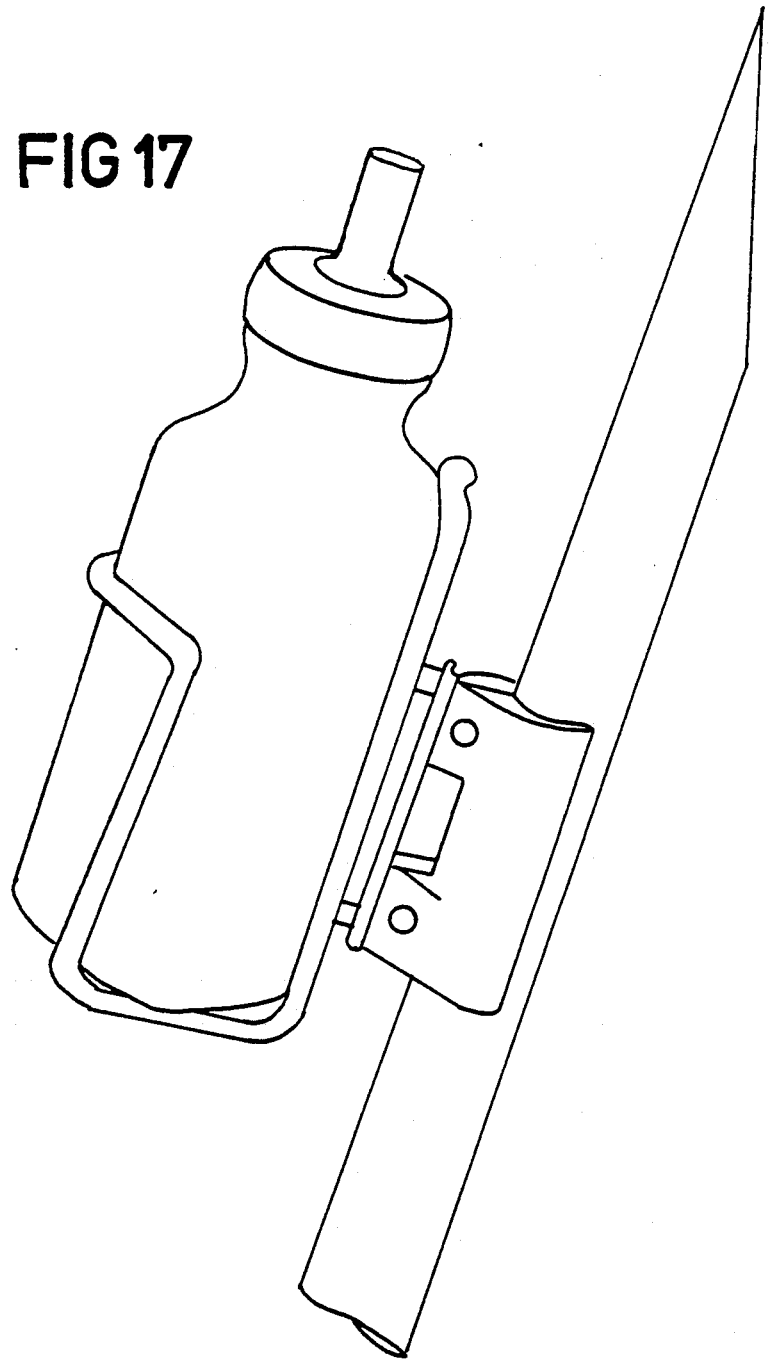
FIGS. 17-20 are pictorial views demonstrating various positioning of water bottle holders using my new clamp on boss and its variations.

FIG. 16 is a pictorial illustration of this model in a clamp on configuration as opposed to a self clamping configuration.

FIG. 16 is a hybrid as configured in the illustration. It can clamp to tubing by conventional clamping methods using the slotted ridge 42. It can have one of its ends bolt directly to just one brazed on boss with its other end clamped to the tubing. See FIG. 27 for an illustration of this embodiment. It can also bolt directly to both factory installed bosses. The model can bolt directly to both factory installed brazed on bosses and by elongating the body 38 or the neck 44, twin water bottle holder capacity can now be achieved by both large and small framed bicycles using just one pair of factory installed brazed on boss fixtures.

A benefit to this arrangement is the added sturdiness of having my clamp on boss bolted to both factory installed bosses.

FIG. 16 has three pair of five milimeter threaded slots 30 located laterally to one another. Two pair of slots are on the boss side base 31b with the remaining pair of slots on the top boss base 31. All threaded slots 30 are spaced to conform with water bottle holder slots 60 in FIG. 28.

FIG. 16 is designed to be manufactured in lengths required by the individual cyclist. Either end of this model can use various clamping devices in conjunction with the channeled ridge 42.

Sturdy clamping methods are necessary when riding in rough terrain. FIGS. 21–23 and 24 show two clamping methods reduced to practice.

The objective of the clamp on boss and its variations is to give different types of cyclists versatility in mounting water bottles to their bicycles. Because of individual variables with respect to rider and machine, my clamp on boss and its variations were invented to give this versatility. Many types of clamping devices are known to cyclists and the bicycle industry. My clamp on bosses are designed to accommodate as many of these clamping arrangements as possible. It is not inventor's intention to exhaust this field.

The pictorials in FIGS. 25a–d is a simplified version of the above described self clamping wedge boss.

FIGS. 25a–d shows three threaded five millimeter slots 30 per wedge. These wedges are designed to bolt directly to factory installed brazed on bosses of larger framed bicycles giving them twin water bottle holder capacity.

Smaller frames with or without factory installed brazed on boss fixtures can utilize this model variation with traditional clamping methods via the slotted channel 42. One clamping method for FIGS. 25a–d is shown in FIGS. 21–23. A clamp on boss is placed onto the tubing 53 where a hook band 50 is attached around the tubing to both slotted channels 42. To remove looseness and tighten clamp on boss to tubing, a presser foot 47 is installed under the clamp on body. This presser foot 47 is made of aluminum and contours to the underside of the wedge boss body.

The preferred embodiment is to machine a slot under the wedge boss body where the presser foot is housed. The depth of this machined slot is equal to the thickness of the presser foot. When presser foot is placed on tubing, the wedged clamp on boss is placed on top of the presser foot. A clamp band 50 is then attached to the slotted channels 42. The top boss base threaded slot 30 is now used to receive a five millimeter hex bolt which, when screwed, will apply pressure to the presser foot causing the band 50 to tighten around the tubing.

Presser foot is designed with an oval depression 48 which keeps top boss base 31 hex bolt 30a from slippage. This clamping embodiment works equally well on all of my clamp on variations which utilize traditional bicycle industry metal or plastic bands 50.

While the above description contains many specificities, the reader should not construe these as limitations on the scope of the invention, but merely exemplifications of preferred embodiments thereof. Those skilled in the art will envision many other possible variations are within its scope. For example skilled artisans will readily be able to change the dimensions and shapes of the various embodiments. They can make many variations on the adjustment mechanism of FIGS. 4 and 12.

Accordingly the reader is requested to determine the scope of the invention by the appended claims and their legal equivalents, and not by the examples which have been given.

Therefore I claim:

1. A two piece clamp for attaching at least one water bottle holder to the tubular frame of a bicycle comprising:

first and second members complimentally configured to be joined together at interface surfaces on each member, each member having an arcuate surface defining a contiguous inner arcuate surface, when mounted together, adapted to surround and clampingly receive a tubular member of a bicycle frame, one of said members including at least one flattened outer surface adapted for receiving a water bottle holder, said contiguous surface being discontinuous over a portion opposite said outer flattened surface, said interface surfaces being located adjacent said flattened outer surface and being disposed at an acute angle with respect to said flattened outer surface, and means for securing said first and second members together.

* * * * *